(No Model.)  2 Sheets—Sheet 1.
G. H. HOOPER.
ORE CONCENTRATOR.
No. 524,593. Patented Aug. 14, 1894.
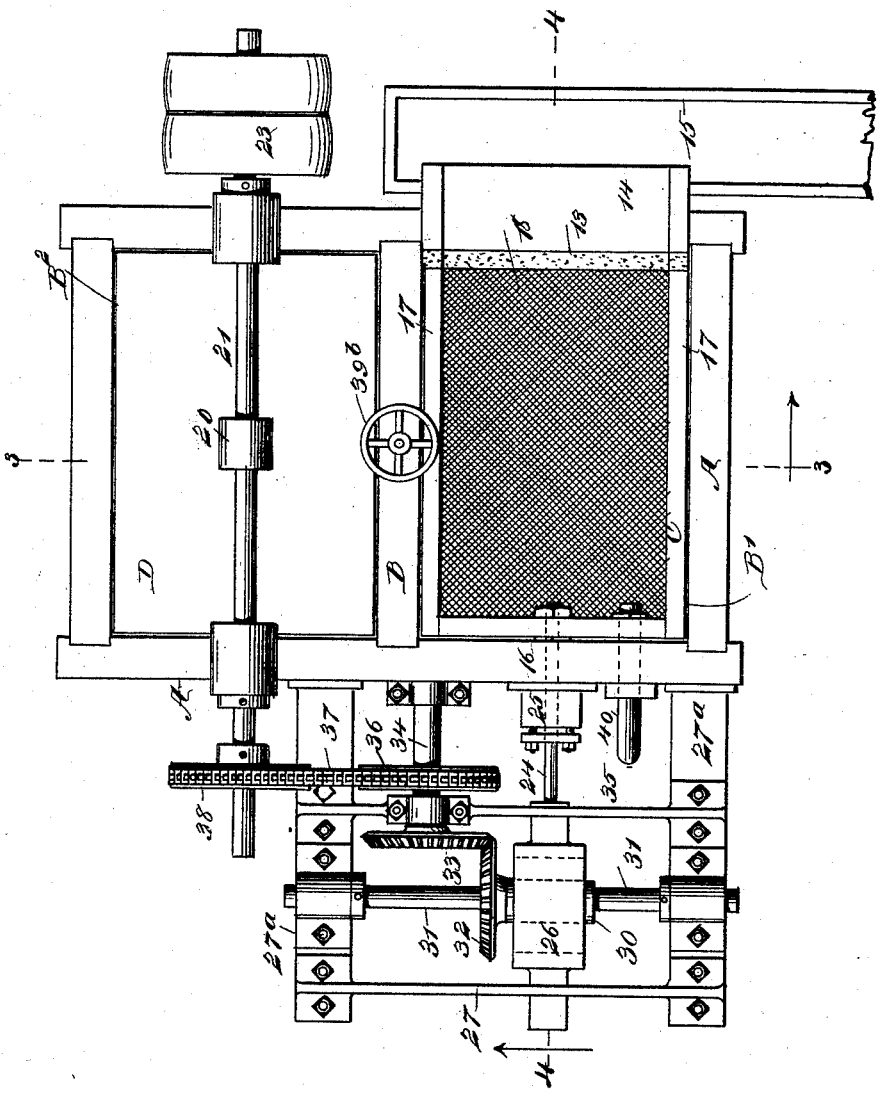
WITNESSES:
Joshua Bergstrom
C. Sedgwick
INVENTOR
G. H. Hooper
BY
Munn & Co.
ATTORNEYS.

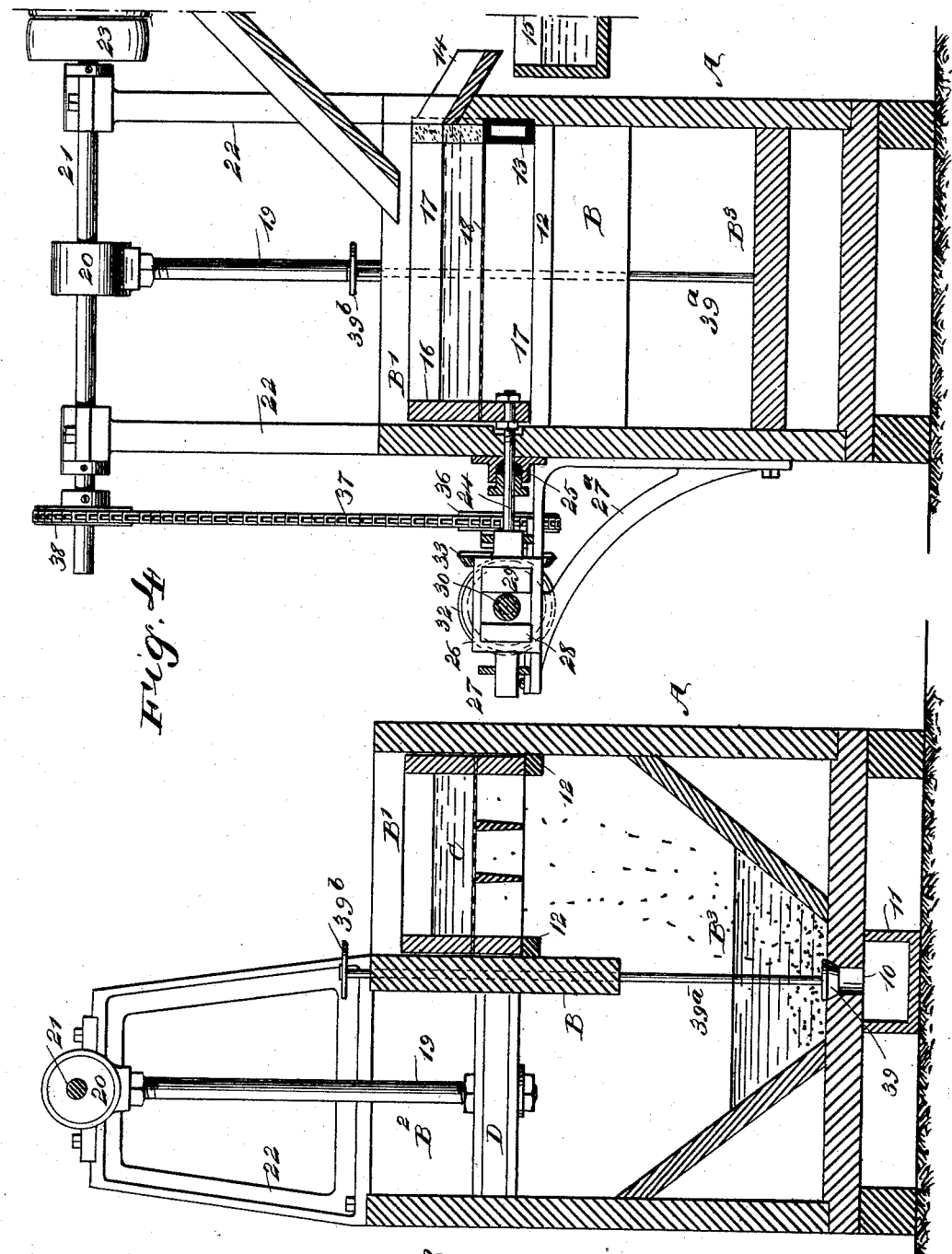

UNITED STATES PATENT OFFICE.

GEORGE H. HOOPER, OF HAGUE, NEW YORK.

ORE-CONCENTRATOR.

SPECIFICATION forming part of Letters Patent No. 524,593, dated August 14, 1894.

Application filed January 31, 1894. Serial No. 498,586. (No model.)

*To all whom it may concern:*

Be it known that I, GEORGE H. HOOPER, of Hague, in the county of Warren and State of New York, have invented a new and Improved Ore-Concentrator, of which the following is a full, clear, and exact description.

My invention relates to an improvement in ore concentrators, and it has for its object to provide a machine in which the sieve, screen or separating medium will have substantially a vibratory movement in a lateral direction, and whereby also a plunger will be employed, operating in connection with the screen or sieve, the operation of the plunger being such that when the screen is vibrated in the direction of its overflow, the plunger will be upon its down stroke, whereby when the screen is upon its return movement, the up stroke of the plunger takes place and will create suction at the screening surface of the screen or sieve. In this manner, the mineral will cling to the screening surface at the forward movement of the screen, and will be released from said surface when the screen is moved in direction of its overflow; thus the mineral is gradually worked to the forward end of the sieve, since it will move forward at each rear movement of the screen.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a plan view of the machine. Fig. 2 is a section through the forward portion of the screen or sieve and forward portion of the tank, illustrating the application to the former of a draft faucet or pipe. Fig. 3 is a vertical longitudinal section through the machine, taken practically on the line 3—3 of Fig. 1; and Fig. 4 is a similar section taken essentially on the line 4—4 of Fig. 1.

In carrying out the invention a box or tank A is employed as the body of the machine, and the said box or tank is divided by a partition B into two upper compartments B' and B², which compartments are united at the central and lower portion of the tank to form a lower compartment or chamber B³, which is provided with inclined side walls adapted to direct material to the central lower portion of this chamber, at which point an opening 10, is formed leading into an offtake chute 11.

A sieve C, is adapted to have lateral movement in the upper compartment B', being made to rest upon slide-ways 12, while a plunger D, is located in the second upper compartment B². The sieve C, at its rear or delivery end, is made to rest upon a cushion 13, which is attached to the inner face of the tank. This cushion is in engagement not only with the bottom of the sieve or screen but likewise with both of its sides, and the cushion may be attached in any approved manner to the sieve in order that the sieve may have lateral movement, and yet a water-tight connection be established between the delivery end of the sieve and that portion of the tank at which the cushion is secured, since it is then necessary only that the sieve should have slight movement.

The delivery end of the sieve is in communication with a spout 14, secured to the rear upper wall of the tank, and below the said spout a trough 15, is located, adapted to receive the material from the spout. The distance between the bottom of the sieve and the bottom of the spout 14 where it connects with the sieve, regulates the depth of water and material possible to remain in the sieve before it overflows into the spout. The sieve consists practically of a forward end plate 16, parallel side plates 17 and a screening or sieving surface 18 extending from end to end of the sieve.

The plunger D, is connected with a stem 19, and the said stem is connected through the medium of an eccentric 20 with a drive shaft 21, the eccentric being so constructed that the plunger will have comparatively but little movement, yet a rapid one. The drive shaft 21, is mounted to revolve in standards 22 erected upon the tank, the said shaft being also provided with fast and loose pulleys 23 for connection with the source of power employed.

The sieve is laterally reciprocated through the medium of a shaft 24 connected with its forward end and held to slide in a stuffing box 25, located upon the tank. The shaft 24 at its outer end is connected with a yoke 26, which has sliding and guided movement in a guide bar 27 located upon an extension 27ª of the forward portion of the tank. Two blocks 28 and 29, are located within the yoke, the said blocks being engaged by a cam or eccentric 30, mounted upon or formed integral with a shaft 31 journaled in the extension frame 27ª of the tank, as shown in both Figs. 1 and 4. The shaft 31 is provided with a beveled gear 32, which meshes with a similar gear 33 mounted upon a short shaft 34 journaled in boxes secured to a cross bar 35 located upon the extension frame 27ª and likewise upon the forward side of the tank.

A sprocket wheel 36, is mounted upon the shaft 34, which is connected by a link belt 37 with a sprocket wheel 38 located upon one end of the drive shaft 21, and the movement of the driving mechanism of the piston or plunger D and that of the sieve or screen is so timed or regulated, that upon the forward motion of the screen or sieve the plunger or piston will be upon its up stroke, the down stroke occurring at the rearward movement of the screen, or movement in direction of its overflow. Thus at the forward movement of the screen a suction is created at the screening surface, and the cleaned metal contained in the sieve will be held in engagement with the said screening surface and be prevented from moving in direction of the overflow end, while the material intended to overflow will be carried in direction of the trough 14, and pass out therefrom. Upon the rear movement of the sieve or screen and downward movement of the piston or plunger, the screening surface will be relieved from suction, and the screened metal will move in direction of the forward end of the screen. Thus all matter not desirable to retain is fed to the discharge end of the screen, while the cleaned metal is fed to and maintained in the forward end thereof.

The opening 10 in the bottom of the lower chamber B³ of the tank is normally closed by a valve 39, attached to a valve stem 39ª, and said stem is passed up through the partition B of the tank and is provided with a hand wheel 39ᵇ at its upper end, the stem being so constructed that it may be moved upward either by a screw or pulley connection.

It is evident that any material and fluid passing through the screening surface of the screen or sieve will find its way into the lower chamber B³, and may be discharged from said chamber into the offtake trough or chute 11, by simply raising the valve 39.

In order that the cleaned metal may be readily removed from the screen or sieve, or find an exit therefrom, an offtake pipe 40 is made to enter the front or forward end of the screen over its screening surface, as shown in Fig. 2. This pipe is passed through the forward side of the tank and through a stuffing box 41 located around the opening in the tank. Thus the screen may be laterally reciprocated without danger of water finding an exit from the tank around the offtake pipe 40, while the cleaned metal may readily find an exit into and through said pipe and thus into any vessel placed to receive it.

It will be understood that the mineral may be either drawn off, or removed by hand while the machine is in operation, and that a suitably located pipe may be employed to supply water to the machine when required.

Having thus described my invention, I claim as new and desire to secure by Letters Patent—

1. The combination with the tank or box having an outlet opening, of a sieve or screen movable toward and from said opening and a yielding material or cushion interposed between the discharge end of the screen and the inner face of the tank or box forming a cushion against which said end abuts and compressible by said screen to permit of movement thereof and prevent leakage, substantially as described.

2. An ore concentrator, comprising a box or tank provided with communicating compartments, a sliding screen or sieve in one compartment and a piston in the other, an overflow at one end of the screen or sieve, and a driving mechanism connected with the piston and screen and moving the screen in the direction of its overflow end when the piston is on the down stroke, substantially as described.

3. In an ore concentrator, a box or tank provided with communicating compartments, a screen or sieve held to slide in one of the compartments, a piston located in the opposite compartment, an overflow located at one end of the sieve or screen, a metal exit located at the opposite end of the sieve or screen, a drive shaft, and a driving connection between the drive shaft and the piston and the sieve, the driving connection being such that the piston will be upon its down stroke when the sieve is reciprocated in direction of its overflow end, as and for the purpose specified.

4. In an ore concentrator, the combination, with a box or tank divided into two compartments at the top, the said compartments merging into one at the bottom of the tank, the lower compartment being provided with a valved outlet, of a sieve held to reciprocate in one of the upper compartments, provided with an overflow at one end and a metal offtake at the opposite end, a piston held to slide in the opposite compartment, a drive shaft, an eccentric connection between the drive shaft and the piston, a line shaft driven from the drive shaft, and an eccentric connection between the line shaft and the metal-delivery end of the sieve, the movement of the eccentric driving the piston and sieve being so timed that the up stroke of the piston will be accomplished simultaneously with the movement of the sieve in direction opposite its overflow, as and for the purpose specified.

5. In an ore concentrator, the combination, with a box or tank divided at its upper end into two compartments, said compartments uniting in a single compartment at the lower portion of the tank or box, the lower compartment being provided with a valved outlet, a drive shaft located above the tank, a line shaft journaled upon an extension from the box or tank, and a driving connection between the line shaft and drive shaft, of a delivery trough located at one side of the box or tank, a sieve held to reciprocate in one of the upper compartments of the box or tank, having overflow connection at one end with said trough and provided at its opposite end with a metal outlet, a cushion connection between the tank and the sieve at the outlet end of the latter, a shaft connected with the metal outlet end of the sieve, connected with a sliding yoke, an eccentric located upon the line shaft, adapted to operate said yoke, a piston located in the chamber of the box or tank adjoining that in which the sieve is located, and a stem connected with the piston and having eccentric connection with the drive shaft, the movement of the piston with relation to the sieve being timed, substantially as shown and described.

GEORGE H. HOOPER.

Witnesses:
WILLIAM HOOPER,
THOS. W. BROWNELL.